United States Patent
Lam

(10) Patent No.: US 10,128,020 B2
(45) Date of Patent: Nov. 13, 2018

(54) ELECTRICAL APPARATUS

(71) Applicants: Soow Kheen Wong, Johor Bahru (MY); Luk Mui Joe Lam, Johor Bahru (MY)

(72) Inventor: Luk Mui Joe Lam, Johor Bahru (MY)

(73) Assignees: Soow Kheen Wong, Johor Bahru (MY); Luk Mui Joe Lam, Johor Bahru (MY)

( * ) Notice: Subject to any disclaimer, the term of this patent is extended or adjusted under 35 U.S.C. 154(b) by 13 days.

(21) Appl. No.: 15/311,780

(22) PCT Filed: May 16, 2014

(86) PCT No.: PCT/MY2014/000104
§ 371 (c)(1),
(2) Date: Nov. 16, 2016

(87) PCT Pub. No.: WO2015/174818
PCT Pub. Date: Nov. 19, 2015

(65) Prior Publication Data
US 2017/0148537 A1    May 25, 2017

(51) Int. Cl.
| | |
|---|---|
| H01B 7/04 | (2006.01) |
| H01B 1/04 | (2006.01) |
| G02B 6/44 | (2006.01) |
| H01B 7/02 | (2006.01) |
| H01B 7/18 | (2006.01) |
| H01B 7/28 | (2006.01) |
| H01B 7/295 | (2006.01) |
| H01B 9/00 | (2006.01) |

(Continued)

(52) U.S. Cl.
CPC .............. *H01B 1/04* (2013.01); *G02B 6/443* (2013.01); *G02B 6/4416* (2013.01); *H01B 7/0225* (2013.01); *H01B 7/1825* (2013.01); *H01B 7/28* (2013.01); *H01B 7/295* (2013.01); *H01B 9/003* (2013.01); *H01B 9/005* (2013.01); *H01B 9/024* (2013.01); *H01B 9/04* (2013.01)

(58) Field of Classification Search
USPC .............. 174/110 R, 120 R, 120 SC, 121 R, 174/107–109
See application file for complete search history.

(56) References Cited

U.S. PATENT DOCUMENTS 3,109,881 A * 11/1963 Publow ............... H01B 7/0063
174/118
4,373,977 A * 2/1983 Rothwarf ................ H01B 1/04
156/51

(Continued)

OTHER PUBLICATIONS

International Search Report of International Application No. PCT/MY2014/000104, dated Mar. 13, 2015, total 3 pages.

*Primary Examiner* — William H Mayo, III
(74) *Attorney, Agent, or Firm* — Hamre, Schumann, Mueller & Larson, P.C.

(57) ABSTRACT

An electrical apparatus that includes a cable connected to a transmission optimizer and configured to conduct a current for matching a desired power output. The cable includes at least one insulated conductor core including an innermost insulating layer disposed around the outside of a conducting layer having carbon fiber or graphite fiber as a conductor core. The cable is a single core cable having a single insulated conductor core or a multi-core cable having multiple single insulated conductor cores.

33 Claims, 4 Drawing Sheets

(51) Int. Cl.
*H01B 9/02* (2006.01)
*H01B 9/04* (2006.01)

(56) References Cited

U.S. PATENT DOCUMENTS

| | | | |
|---|---|---|---|
| 7,179,522 B2* | 2/2007 | Hiel | H01B 5/105 |
| | | | 174/102 R |
| 7,819,109 B2* | 10/2010 | Lam | H01B 7/0063 |
| | | | 123/604 |
| 7,969,873 B2 | 6/2011 | Rozental | |
| 8,604,340 B2 | 12/2013 | Jiang et al. | |
| 2002/0163683 A1 | 11/2002 | Antoniades et al. | |
| 2004/0020681 A1* | 2/2004 | Hjortstam | B82Y 30/00 |
| | | | 174/102 SC |
| 2007/0151744 A1* | 7/2007 | Chen | H01B 1/026 |
| | | | 174/110 R |
| 2008/0170982 A1* | 7/2008 | Zhang | B82Y 10/00 |
| | | | 423/447.3 |
| 2010/0163275 A1* | 7/2010 | Hiel | B29C 70/52 |
| | | | 174/124 R |
| 2010/0230132 A1* | 9/2010 | Swift | A61B 5/00 |
| | | | 174/119 R |
| 2015/0210846 A1* | 7/2015 | Qi | C08G 59/26 |
| | | | 174/126.1 |

* cited by examiner

ELECTRICAL APPARATUS

BACKGROUND OF THE INVENTION

Conventional electrical apparatus comprises a cable having a metal wire conductor core to conduct the current for the transmission of power, data and signal. Conventional cable conductor is commonly derived from metal wires based on copper and aluminum. Other metal and metal alloy wire may also be used as a cable conductor for specialty applications. Metal wire has a high specific gravity, for example, armored cables are heavy and rigid with handling difficulties. Metal wire has poor corrosion and weathering resistance, for example, the electrical property of an insulated copper-cable may be deteriorated upon performance ageing, and the most prominent failure is the ingress of water into a section of the plastic insulated copper-cable. Upon a strike of thunder storm, lightning may enter a section of the cable buried or aerial, and causing the melting of the conductor for instance at the copper connecting locations. The high current flow from lightning strike on the cable may cause decrease in impedance that could adversely affecting the bandwidth circuit.

Conventional insulated copper-cable is prone to theft. Metal theft on the copper-cable is a crime concern. Insulated copper-cable and fibre optic cable are commonly used in the transmission of power, data and signal. The market trends of cable requirement include cost reduction, light and flexible, easy handling and installation, a minimum disturbance of EMI and RFI, and a minimum loss of bandwidth (megabites). The copper-cable transmits data and signals in form of electrical and or electronic pulses. The fibre optic cable transmits data and signal in form of light pulse. The installation of fibre optic lines is expensive, which includes a transmitter to convert coded electrical and or electronic pulse to an equivalent coded light pulse, and a conversion device to convert the coded light pulse to an equivalent coded electrical pulse and or electronic pulse. Fibre optic cable has wide bandwidth, which is often used in backbone network. Fibre optic cable has good light transmittance, but poor sound transmittance.

This invention relates to an electrical apparatus comprising a cable having a carbon fibre or graphite fibre as a conductor core to conduct current for the transmission of power, data and signal. It is an object of at least one embodiment of this invention to address those drawbacks of conventional metal wire conductor and fibre optics, and to fulfill the market trend requirement of the cable industry.

SUMMARY OF THE INVENTION

According to one aspect of this invention, there is provided a cable having a resistance per unit length of less than 40 $\Omega$/m and the cable having a carbon fibre or graphite fibre as a conductor core to conduct an electric current for the transmission of power, data and signal. According to another aspect of this invention, there is provided an electrical apparatus for the transmission of power, data and signal. The apparatus is used to conduct a current in the range of 0.01 mA to 800 A at a voltage ranges from 12V to 140 KV and or matching a desirable power output for the transmission of power, data and signal. The apparatus includes a transmission optimizer connecting to a cable, and the cable having at least one insulated conductor core, and the insulated conductor core formed with an insulating polymeric material being disposed around the outside of a conducting layer having carbon fibre or graphite fibre as a conductor core. The cable has a low electro-resistance of below 40 $\Omega$/m. The carbon fibre or graphite fibre conductor core includes fibre filaments arranged in a bundle, extending side-by-side. The carbon fibre or graphite fibre is derived from the carbonization of man-made fibres, and coal tar and petroleum pitch. The man-made fibres may include cellulose, rayon, homopolymer and copolymer of polyacrylonitrile. The carbon fibre or graphite fibre has a specific gravity in the range of 1.1 to 2.2. The fibre conductor core has excellent corrosion resistance, chemical inertness, good fatigue and electrical damping characteristics. The fibres have a tensile strength in the range of 690 MPa to 6.2 GPa. The fibre is incombustible and flame resistance.

Conventional cable has a conductor core including solid metal wire, which may be derived from copper, aluminum, steel wire, metal alloys, and or other metals. The specific gravity and tensile strength of copper and its alloy have a specific gravity and tensile strength in the range of 8.86 to 9 and 200 MPa to 400 MPa respectively. Aluminum and its alloy have a specific gravity and tensile strength in the range of 2.5 to 2.8 and 89 MPa to 518 MPa respectively. Steel wire has a specific gravity and tensile strength of 7.9 and 1.3 GPa respectively. In short, the specific gravity and tensile strength of the metal wire is within the range 2.5 to 9 and 89 MPa to 1.3 GPa respectively. Copper and aluminum are the most common conductor cores for the cable industry. The cable derived from the carbon fibre or graphite fibre conductor core is more flexible, lighter and stronger than conventional metal wire conductor.

Aluminum may subject to fatigue failure. Copper may subject to weathering corrosion. The melting temperature of copper and aluminum is about 1084° C. and 660° C. respectively. Steel wire has a melting temperature of 1510° C. The high ampere cable including welding cable requires to use big cross sectional area of copper wire, for examples, 100 A and 500 A copper-cable requires cross sectional area of copper wire 16 $mm^2$ and 70 $mm^2$ respectively. The price of metal wire fluctuates with the supply and demand. Metal theft on copper-cable is a crime concern. There is no metal theft according to the carbon fibre-cable or the graphite fibre-cable. In compare with metal wire, the price of carbon fibre and graphite fibre is comparatively stable, and quality is more consistent. Carbon fibre or graphite fibre has higher electro-resistance than metal wire. The cable conductor core may include a combination of carbon fibre or graphite fibre with metal wire for the transmission of power, signal and data. The fibre may reduce the cable weight and improve the flexibility and handling of the cable. The fibre may improve the weathering and corrosion resistance of the copper-cable. The fibre may improve the resistance to lightning strike. The fibre may reduce the cross sectional area of the conductor core, for example, as for 500 A cable, the cross sectional area of conductor core may reduce from 70 $mm^2$ to 30 $mm^2$ or less. The fibre may reduce cost of conventional copper-cable and aluminum-cable. The fibre is incombustible and not subject to melting. The fibre may enable the cable for extreme heat applications that exceed the limit of conventional metal wire, for example, the recommended service temperature of bare copper wire is 99° C., tin plated copper of 149° C., silver plated copper of 199° C., and nickel plated copper of 249° C. The fibre has excellent electrical damping property, that may minimize the EMI and RFI disturbance, and minimize the loss of bandwidth.

Fibre optic cable is used for high speed transmission of data and signal. The installation of fibre optic lines is expensive, which includes a transmitter to convert coded electrical and or electronic pulse to an equivalent coded light pulse, and a conversion device to convert the coded light pulse back to an equivalent coded electrical and or electronic pulse. Fibre optic cable has wide bandwidth, which is often used in backbone network. Fibre optic cable has good light transmittance, but poor sound transmittance. The carbon fibre or graphite fibre has better sound transmittance than fibre optics. The installation line of carbon fibre-cable is cheaper than fibre optic cable. Carbon fibre-cable does not require a light pulse transmitter and a conversion device.

The cable may include carbon fibre or graphite fibre for the transmission of power, data and signal.

The cable may include a combination of carbon fibre or graphite fibre with the fibre optics for the transmission of power, data and signal.

The cable may include a combination of carbon fibre or graphite fibre with metal wire for the transmission of power, data and signal.

The cable may include a combination of carbon fibre or graphite fibre with metal wire and fibre optics for the transmission of power, data and signal.

The transmission optimizer of the electrical apparatus is an electrical device to provide an adjustable electrical voltage and or current for the cable to conduct the required determinable current matching the desirable power output for the transmission of power, data and signal. The cable may include at least one conductor core formed with at least partly from an electrically conducting material that includes carbon fibre or graphite fibre.

The cable may include at least one insulated conductor core being formed with an innermost insulating layer disposed around the outside of the conductor core.

The cable may include an innermost insulating layer formed with an insulating polymeric material, disposed around the outside of the conductor core. The cable may include an inner insulating layer forms an inner jacketing by insulating polymeric material disposed around the outside of the insulated conductor core. The insulating polymeric material has a breakdown voltage (20° C.) of at least 18 KV/mm. The insulating polymeric material may include thermoplastics, for examples, polyvinyl (PVC, XLPVC), polyolefins and its derivatives (LDPE, HDPE, XLPE, foamed PE, PP, EVA, PTFE and others), polystyrene (PS), polyamide (PA), polyurethane (PUR), and others. The insulating polymeric material may include thermoplastic elastomers, for examples, polyester elastomer (TPE-E), polyolefine elastomer (TPE-O), thermoplastic vulcanisates (TPV), and others. The insulating polymeric material may include thermosetting rubber, for examples, natural rubber (NR), styrene-butadiene rubber (SBR), fluoroelastomer (FKM), fluorosilicone rubber, silicone rubber (SiR), ethylene-propylene copolymer (EPM), ethylene-propylenediene terpolymer (EPDM), ethylene-vinyl acetate copolymer (EVM), ethylene-vinylacrylate copolymer (EAM), polychloroprene (CR), chlorosulphonated polyethylene (CSM), chlorinated polyethylene (CPE), nitrile rubber (NBR), hydrogenated nitrile rubber (HNBR), and others. The insulating polymeric material may include a blending of thermoplastics and thermosetting rubber.

The cable may include a shielding layer formed with metal tape or wire-braid disposed around the outside of the insulated conductor core. The metal tape may include copper, steel and aluminum having a flat sheet and or corrugated configuration. The metal wire-braid may include steel wire in a form of braiding. Other metal may also be used.

The cable may include a shielding layer formed with a semi-conductive polymeric material having a resistivity in the range of 10 Ω·m to 100 MΩ·m at 15° C., and disposed around the outside of the conductor core. The semi-conductive polymeric material may be derived from thermoplastics, thermoplastic elastomers, and thermosetting rubber being compounded with conductive fillers and additives. The cable may include a shielding layer formed with a semi-conductive polymeric material disposed around the outside of the insulated conductor core.

The cable may include a shielding layer disposed around the outside of the insulated conductor core and formed by yarn-braid or tape being derived from carbon fibre or graphite fibre.

The cable may include an outer insulating layer disposed around the outside of the insulated conductor core by preferably flame retardant polymeric material having a breakdown voltage (20° C.) of at least 18 KV/mm to protect the cable against damage from weathering and mechanical exposures. The flame retardant polymeric material may be derived from thermoplastics, thermoplastic elastomers, and thermosetting rubber being compounded with flame retardant fillers and additives.

The cable may include a reinforcement layer disposed around the outside of the insulated conductor core in a form of yarn-braid or tape derived from man-made fibres and glass fibre. The man-made fibres may include cellulose, rayon, polyester, polyamide, polyaramid, and others.

The cable may include an outermost protecting and shielding layer in a form of metal wire-braid disposed around the outside of the outer insulating layer.

The cable may include an outermost protecting layer in a form of yarn-braid disposed around the outside of the outer insulating layer.

The cable may include an insulated conductor core without a reinforcement layer, a protecting layer and a shielding layer. The insulated conductor core may be formed by extrusion of a single layer of insulating polymeric material around the outside of the conductor core. The insulated conductor core may be formed with two layers of insulating polymeric material by double extrusion. The insulated conductor core may be formed with three layers of insulating polymeric material by a triple extrusion. The cable may include an insulated conductor core with a reinforcement layer, and in the absence of a protecting and a shielding layer. The cable may include a reinforcement layer disposed in between the insulated conductor core and outer insulating layer.

The cable may include a single insulated conductor core to form a single-core cable. The cable may be connected to a transmission optimizer when there is a requirement of voltage and or current adjustment for the cable to conduct the required determinable electric current so as to match a desirable power output for the transmission of power, data and signal. The transmission optimizer may not be required when there is no requirement for voltage and current adjustment.

The cable may include multiple numbers of single insulated conductor core to form a multi-core cable. The cable may include an inner insulating layer disposed around the outside of the multiple numbers of the insulated conductor core in a form of inner jacketing. The multiple numbers are in the range of 2 (two) to 100 (one hundred), and most preferably below 5 (five) for general purpose application, and most preferably below 60 (sixty) for heavy duty application. A certain number of the multiple numbers of the insulated conductor core, for example in the range of 2 (two) to 8 (eight), may be loaded together to form as a group by a wrapping layer with a screen material and or a binder tape, and most preferably below 5 (five) insulated conductor cores to form as a group. The screen material may include a tape derived from metal and thermoplastics, for example aluminum-polyester foil. The binder tape may include polymeric material, for example polyester and polyamide, being fabricated in a form of tape or film. The binder tape may prevent the ingress of water into the insulated conductor core. The cable may include multiple numbers of insulated conductor core, and the conductor cores of the multiple numbers may include carbon fibre or graphite fibre, metal wire, fibre optics, and combinations for the transmission of power, data and signal. The cable may be connected to a transmission optimizer when there is a requirement of voltage and or current adjustment for the cable to conduct the required determinable electric current so as to match a desirable power output for the transmission of power, data and signal. The transmission optimizer may not be required when there is no requirement for voltage and current adjustment.

The inner jacketing may be optional for a single-core cable.

The multi-core cable may include a central strength member and cable filling compound disposed inside the inner jacketing and to fill the gaps in between multiple numbers of insulated conductor core to improve the dimensional stability of the multiple numbers of the insulated conductor core. The strength member may include metal wire, thermoplastics, thermoplastic elastomers and rubber compound in a form of solid core. The cable filling compound may include polymeric material such as thermoplastics, thermoplastic elastomers and thermosetting rubber and or filament yarns.

The cable of this invention conducts a current in the range of 0.01 mA to 800 A at a voltage ranges from 12V to 140 KV for the transmission of power, data and signal. The cable has a low electro-resistance of below 40 Ω/m, and including at least one conductor core, and the conductor core formed at least partly from an electrically conducting material that includes carbon fibre or graphite fibre; at least one insulated conductor core, and the insulated conductor core being formed with an innermost insulating layer disposing around the outside of the conductor core, and the innermost insulating layer includes insulating polymeric material having a breakdown voltage (20° C.) of at least 18 KV/mm; an inner insulating layer forms an inner jacketing by insulating polymeric material having a breakdown voltage (20° C.) of at least 18 KV/mm and disposed around the outside of the insulated conductor core; and an outer insulating layer forms an outer jacketing by preferably flame retardant insulating polymeric material to protect the cable against damages from weathering and mechanical exposures.

The innermost insulating layer and the inner insulating layer may be replaced with a single insulating layer by insulating polymeric material having a breakdown voltage (20° C.) of at least 18 KV/mm. The inner insulating layer and the outer insulating layer may form a single layer by insulating polymeric material having a breakdown voltage (20° C.) of at least 18 KV/mm. The innermost, inner and outer insulating layer may form a single layer by polymeric material having a breakdown voltage (20° C.) of at least 18 KV/mm. The insulating polymeric material may include thermoplastics, thermoplastic elastomers, thermosetting rubber, and a blending of thermoplastics with thermosetting rubber.

The carbon fibre or graphite fibre conductor core has filaments arranged in a bundle, extending side-by-side. The carbon fibre or graphite fibre has a specific gravity in the range of 1.1 to 2.2, and tensile strength in the range of 690 MPa to 6.2 GPa. The carbon fibre or graphite fibre may be derived from the carbonization of man-made fibres, and coal tar and petroleum pitch. The fibre conductor is incombustible and having excellent weathering and corrosion resistance, chemical inertness, good fatigue and electrical damping characteristics.

The cable conducts a current in the range of 0.01 mA to 800 A at a voltage ranges from 12V to 140 KV, that may be achieved by connecting one end of the cable to a transmission optimizer. The transmission optimizer is an electrical device to provide an adjustable electrical voltage and or current for the cable to conduct the required determinable electric current so as to match a desirable power output for the transmission of power, data and signal.

The cable may include a shielding layer disposed around the outside of the conductor core to shield the electric current. The shielding layer may include a semi-conductive polymeric material having a resistivity in the range of 10 Ω·m to 100 MΩ·m at 15° C. The shielding layer may include metal material in a form of tape or wire-braid. The shielding layer may include carbon fibre or graphite fibre in a form of yarn-braid or tape.

The cable may include a reinforcement layer disposing around the outside of the insulated conductor core, and the reinforcement layer may include man-made fibres and glass fibre in a form of yarn-braid or tape.

The cable may include an outermost protecting and shielding layer in a form of metal wire-braid disposed around the outside of the outer insulating layer.

The cable may include an outermost protecting layer disposing around the outside of the outer insulating layer, and the protecting layer may include man-made fibres and glass fibre in a form of yarn-braid.

The cable may include a single insulated conductor core to form a single-core cable. The conductor core may include carbon fibre or graphite fibre for the transmission of power, data and signal. The conductor core may include a combination of carbon fibre or graphite fibre with metal wire for the transmission of power, data and signal. The conductor core may include a combination of carbon fibre or graphite fibre with fibre optics for the transmission of power, data and signal. The conductor core may include a combination of carbon fibre or graphite fibre with metal wire and fibre optics for the transmission of data and signal. The metal wire has a specific gravity in the range of 2.5 to 9, and tensile strength in the range of 89 MPa to 1.3 GPa.

The cable may include multiple numbers of single insulated conductor core to form a multi-core cable. The insulating layer of the inner jacketing disposes around the outside of multiple numbers of the insulated conductor core, and the multiple numbers may be in the range of 2 (two) to 100 (one hundred), and most preferably below 5 (five) for general purpose application, and most preferably below 60 (sixty) for heavy duty application. A certain number in the range of 2 (two) to 8 (eight) of the multiple numbers of the insulated conductor core may be loaded together to form as a group by a wrapping layer with a screen material and or a binder tape, and most preferably below 5 (five) insulated conductor cores to form as a group. For example, a quay crane spider instrumentation cable may include up to 42 (forty two) single insulated conductor cores, with the piling of 3 (three) insulated conductor cores to form a laid-up triad. The screen material may include a tape derived from metal and thermoplastics, for example aluminum-polyester in tape form. The binder tape may include polymeric material, for example polyester nylon and polyolefins, in tape form. The single insulated conductor core may include carbon fibre or graphite fibre. The single insulated conductor core may include fibre optics. The single insulated conductor may include metal wire. The single insulated conductor core may include metal wire and carbon fibre or graphite fibre. The single insulated conductor core may include fibre optics and carbon fibre or graphite fibre. The single insulated conductor core may include a combination of metal wire, fibre optics and carbon fibre or graphite fibre. The multi-core cable may include multiple numbers of the single insulated conductor core, and the conductor cores of the multiple numbers may include carbon fibre or graphite fibre, metal wire, fibre optics, and combinations for the transmission of power, data and signal.

The cable conducts an electric current in the range of 0.01 mA to 800 A at a voltage ranges from 12V to 140 KV being achievable by connecting one end of the cable to a transmission optimizer for the transmission of power, data and signal.

The conductor core composition may include a combination with fibre optics, that requiring the cable with one end connected to a transmitter and the other cable end being connected to a conversion device for the transmission of power, data and signal in form of light pulse.

BRIEF DESCRIPTION OF THE DRAWINGS

Specific embodiments of the invention will now be described by way of examples only and with reference to the accompanying drawings and its modifications, in which.

DETAIL DESCRIPTION OF EMBODIMENTS OF THE INVENTION

Figure 1:
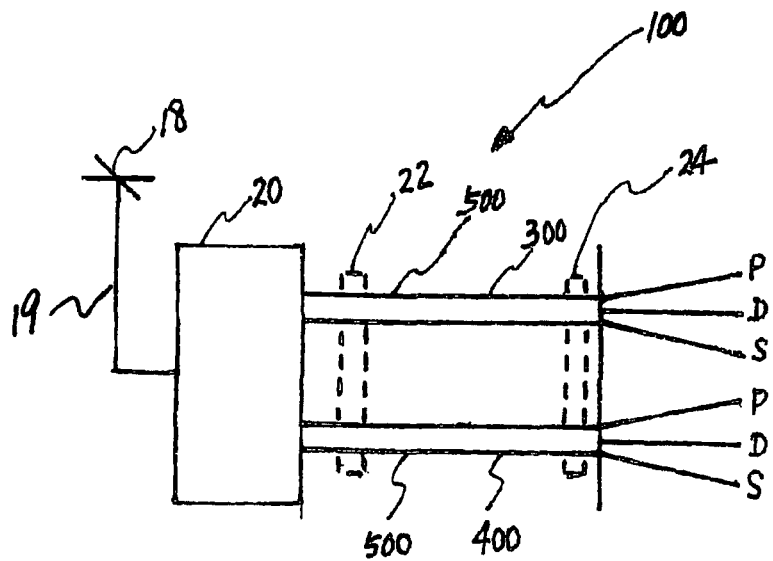
FIG. 1 is a schematic view of an electrical apparatus that embodies this invention.

FIG. 1 shows an electrical apparatus (100) that is a first embodiment of this invention. The electrical apparatus (100) is used for the transmission of power, data and signal under a voltage ranges from 12V to 140 KV. There are several components that go to make up the electrical apparatus (100). These include at least a transmission optimizer (20) and a cable (500). In general the electrical apparatus (100) is arranged with an input end of the transmission optimizer (20) being connected to a source of power supply (18) using a conventional electric cable (19), and the output end and/or the cable (19) being connected to a cable (500). The cable (500) includes a single insulated conductor core to form a single-core cable (300). The cable (500) includes multiple numbers of insulated conductor core to form a multi-core cable (400). The cable (500) conducts a current in the range of 0.01 mA to 800 A under the electrical voltage ranges from 12V to 140 KV and or matching a desirable power output for the transmission of power (P), data (D) and signal (S). The transmission optimizer (20) is an electrical device to provide an adjustable electrical voltage and or current for the cable (500) to conduct the required determinable electric current so as to match the desirable power output from the source of power supply (18) for the transmission of power, data and signal. The cable (500) has an end connected to a transmitter (22, and the other end connecting to conversion device (24). The transmitter (22) is used to convert the coded electrical or electronic pulse to an equivalent coded light pulse, and the conversion unit (24) is used to convert the coded light pulse back to an equivalent coded electrical or electronic pulse. The transmitter (22) and the conversion device (24) are optional components of the electrical apparatus (100). The transmitter (22) and conversion device (24) are incorporated when the cable (500) having a conductor core composition that requires light pulse for the transmission of data and signal.

The cable (500) includes a single conductor core to form a single-core cable (300).

The cable (500) includes multiple numbers of single conductor core to form a multi-core cable (400).

FIG. 2 to FIG. 8 shows the exemplary cables of the cable (500) having a single insulated conductor core in forms of a single-core cable (300).

Figure 9:
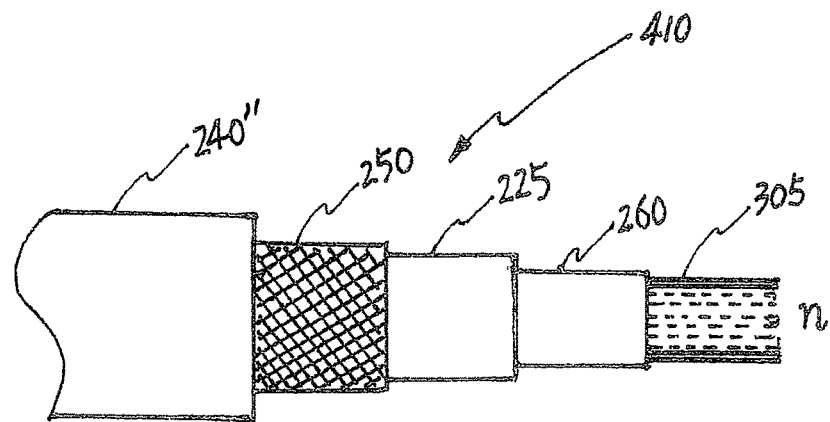
FIG. 9 is a diagrammatic view showing the composition of a eighth exemplary cable.
Figure 10:
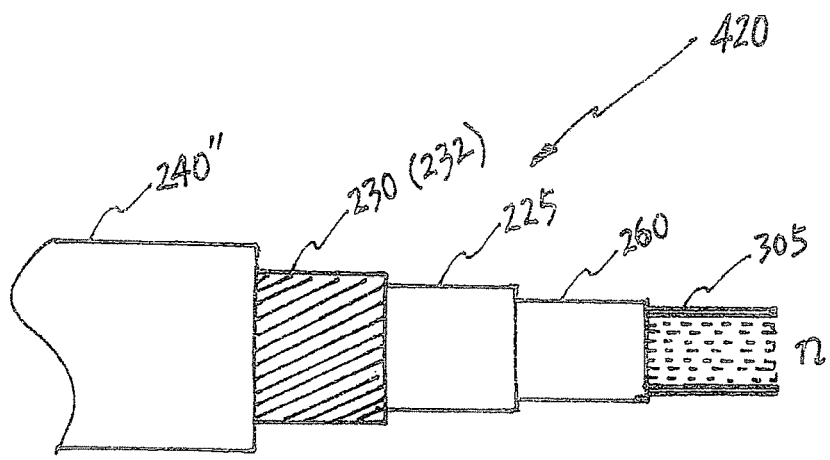
FIG. 10 is a diagrammatic view showing the composition of a ninth exemplary cable.
Figure 11:
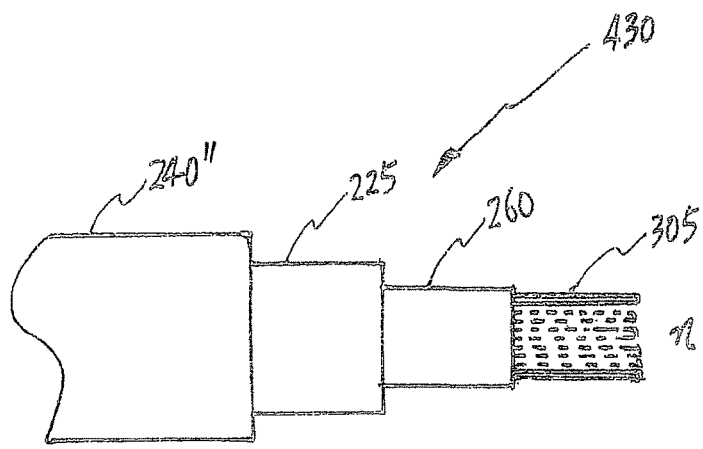
FIG. 11 is a diagrammatic view showing the composition of a tenth exemplary cable.

FIG. 9 to FIG. 11 shows the exemplary cables of the cable (500) having multiple numbers of single insulated conductor core in forms of a multi-core cable (400).

Figure 2:
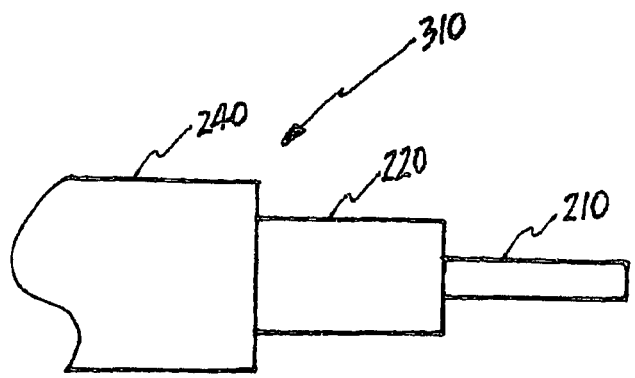
FIG. 2 is a diagrammatic view showing the composition of a first exemplary cable of the electrical apparatus.

FIG. 2 shows the first exemplary cable (310) of the cable (500) or (300). The cable (310) includes an innermost insulating layer (220) disposed around the outside of the conductor core (210). An outer insulating layer (240) disposes around the outside of the innermost insulating layer (220). The conductor core (210) includes carbon fibre or graphite fibre having filaments arranged in a bundle extending side-by-side. The conductor core has a low electro-resistance of below 40 Ω/m. Depending on the cable specification requirement, metal wire and fibre optics can be added to modify the composition of the conductor core (210). The innermost insulating layer (220) and the outer insulating layer (240) are formed with insulating polymeric material having a breakdown voltage (20° C.) of at least 18 KV/mm, for example, with composition being derived from polyvinyl, polyolefins, EPR and silicone rubber. The choice of the insulating composition depends on the cable application requirement including electrical voltage, temperature, and environmental condition.

Figure 3:
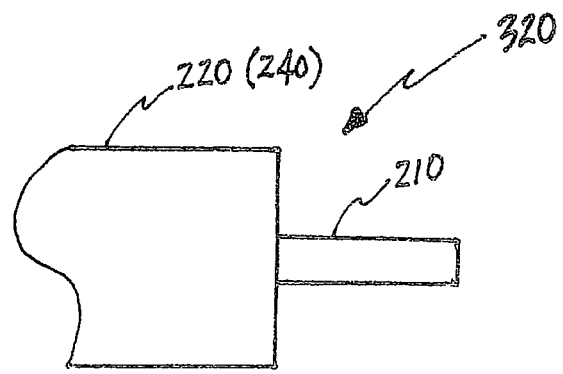
FIG. 3 is a diagrammatic view showing the composition of a second exemplary cable.

FIG. 3 shows the second exemplary cable (320) of the cable (500) or (300). The cable (320) includes a single insulating layer (220) or (240) disposed around the outside of the conductor core (210), formed by a single extrusion.

Figure 4:
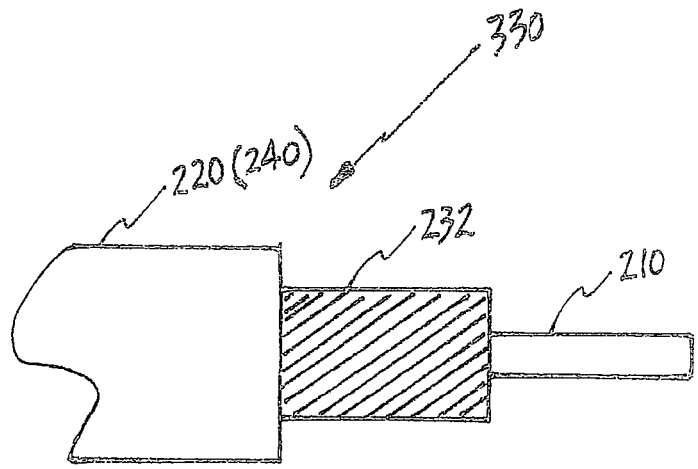
FIG. 4 is a diagrammatic view showing the composition of a third exemplary cable.

FIG. 4 shows the third exemplary cable (330) of the cable (500) or (300). The cable (330) has a similar composition as the cable (320), and with an addition of a shielding layer of a semi-conductive polymeric material (232) disposed in between the conductor core (210) and the insulating layer (220) or (240). The shielding layer (232) includes a semi-conductive polymeric material having a resistivity in the range of 10 Ω·m to 100 MΩ·m at 15° C., for example, with semi-conductive composition being derived from polyolefins and silicone rubber.

The structural design of the cable (330) can be modified with the outer insulating layer (240) disposed around the outside of the innermost insulating layer (220), formed by a double extrusion.

Figure 5:
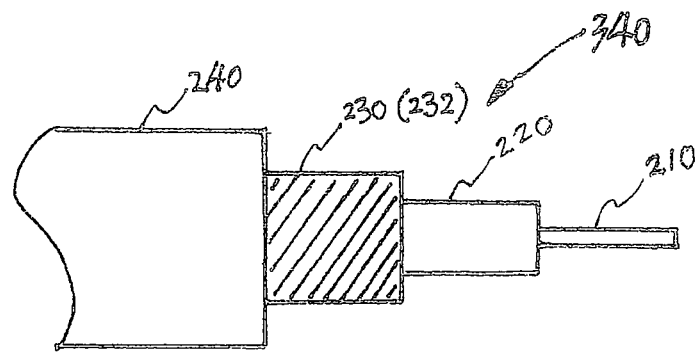
FIG. 5 is a diagrammatic view showing the composition of a fourth exemplary cable.

FIG. 5 shows the fourth exemplary cable (340) of the cable (500) or (300). The cable (340) includes an innermost insulating (220) disposed around the outside of the conductor core (210), and including a shielding layer (230) or (232) disposed in between the innermost insulating layer (220) and the outer insulating layer (240). The shielding layer (230) includes metal wire-braid and metal tape, for examples, steel wire-braid and copper tape, other metals can also be considered. The carbon fibre or graphite fibre can also be used as a shielding layer (230) in forms of yarn-braid and tape.

Figure 6:
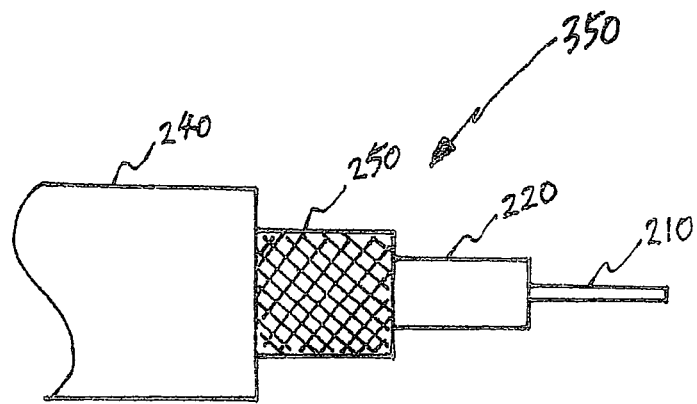
FIG. 6 is a diagrammatic view showing the composition of a fifth exemplary cable.

FIG. 6 shows the fifth exemplary cable (350) of the cable (500) or (300). The cable (350) includes an innermost insulating layer (220) disposed around the outside of the conductor core (210), and including a reinforcement layer (250) disposed in between the innermost insulating layer (220) and the outer insulating layer (240). The reinforcement layer (250) is in a form of yarn-braid with those yarn filaments being derived from man-made fibres and glass fibre. Glass fibre is chosen for its incombustible property.

The structural design of the cable (350) can be modified with incorporating a shielding layer (230) and or (232) disposed in between the innermost insulating layer (220) and the reinforcement layer (250).

The structural design of the cable (350) can be modified by incorporating a shielding layer (230) and or (232) disposed in between the reinforcement layer (250) and the outer insulating layer (240).

Figure 7:
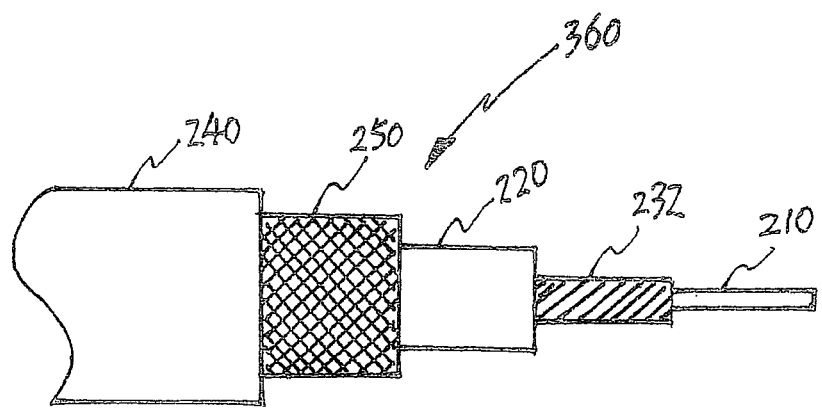
FIG. 7 is a diagrammatic view showing the composition of a sixth exemplary cable.

FIG. 7 shows the sixth exemplary cable (360) of the cable (500) or (300). The cable (360) includes a shielding layer (232) disposed around the outside of the conductor core. An innermost insulating layer (220) disposes around the outside of the shielding layer (232), and including a reinforcement layer (250) disposed in between the innermost insulating layer (220) and the outer insulating layer (240).

The structural design of the cable (360) can be modified by taking out the outer insulating layer (240).

The structural design of the cable (360) can be modified by taking out the innermost insulating layer (220).

The structural design of the cable (360) can be modified by incorporating a shielding layer (230) and or (232) disposed in between the innermost insulating layer (220) and the reinforcement layer (250).

The structural design of the cable (360) can be modified by incorporating a shielding layer (230) and or (232) disposed in between the reinforcement layer (250) and the outer insulating layer (240).

Figure 8:
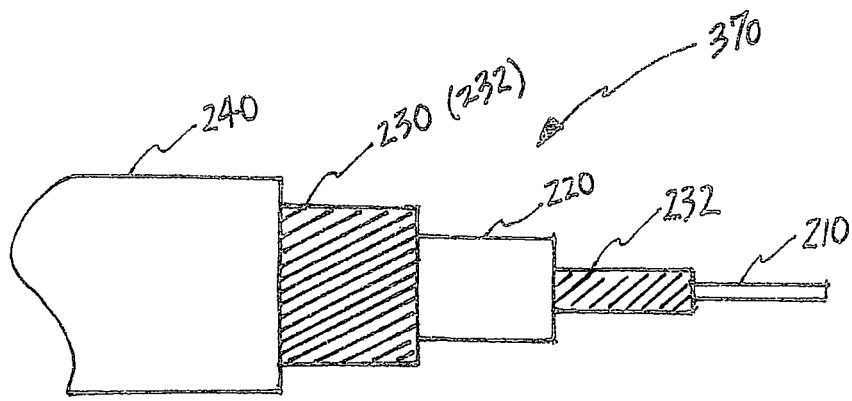
FIG. 8 is a diagrammatic view showing the composition of a seventh exemplary cable.

FIG. 8 shows the seventh exemplary cable (370) of the cable (500) or (300). The cable (370) has a similar composition as the cable (360) with the exception of using a shielding layer (230) and or (230) to replace the reinforcement layer (250).

The structural design of the cable (370) can be modified by incorporating a reinforcement layer (250) disposed in between the shielding layer (232) and the innermost insulating layer (220).

The structural design of the cable (370) can be modified by incorporating a reinforcement layer (250) disposed in between the shielding layer (230) or (232) and the outer insulating layer (240).

FIG. 9 to FIG. 11 shows the exemplary cables of the cable (500) having multiple numbers (n) of insulated conductor core (305) to form a multi-core cable (400). The conductor cores of the multiple numbers (n) can have the same composition including carbon fibre or graphite fibre. The conductor cores of the multiple numbers (n) can have different compositions. The conductor cores of the multiple numbers (n) include carbon fibre or graphite fibre, metal wire, fibre optics, and combinations for the transmission of power, data and signal. The multiple numbers (n) are in the range of 2 (two) to 100 (one hundred), most preferably below 5 (five) for general purpose application, and most preferable below 60 (sixty) for heavy duty application. A certain number in the range of 2 (two) to 8 (eight) of the multiple numbers of the insulated conductor core can be loaded together to form as a group by a wrapping layer (260) with a screen material and or a binder tape. Most preferably below 5 (five) insulated conductor cores (305) form as a group. The wrapping layer (260) includes a screen material of aluminum-polyester in tape form, and or a binder tape being fabricated from thermoplastic material for example polyester. The wrapping layer (260) is optional depending on the cable specification requirement. The insulated conductor core (305) can have similar compositions as the exemplary cables of the cable (300). Most preferably the insulated conductor core (305) has similar composition as the cable (310), (320) and (330).

FIG. 9 shows the eighth exemplary cable (410) of the cable (500) or (400). The cable (410) includes an insulating layer of inner jacketing (225) disposed around the outside of a wrapping layer (260) surrounding multiple numbers (n) of insulated conductor core (305), and including a reinforcement layer (250) disposed in between the inner jacketing (225) and an insulating layer of outer jacketing (240"). The inner jacketing (225) and outer jacketing (240") form with insulating polymeric material having a breakdown voltage (20° C.) of at least 18 KV/mm, for example, with composition being derived from polyvinyl, polyolefins, EPR and silicone rubber.

The structural design of the cable (410) can be modified by incorporating a shielding layer (230) and or (232) disposed in between the inner jacketing (225) and the reinforcement layer (250).

The structural design of the cable (410) can be modified by incorporating a shielding layer (230) and or (232) disposed in between the wrapping layer (260) and the inner jacketing (225).

The structural design of the cable (410) can be modified by incorporating a shielding layer (230) and or (232) disposed in between the reinforcement layer (250) and the outer jacketing (240").

The structural design of the cable (410) can be modified by replacing the inner jacketing (225) with a shielding layer (230) and or (232).

The structural design of the cable (410) can be modified by taking out the outer jacketing (240").

FIG. 10 shows the ninth exemplary cable (420) of the cable (500) or (400). The cable (420) includes an inner jacketing (225) disposed around the outside of a wrapping layer (260) surrounding the outside of multiple numbers of insulated conductor core (305), and including a shielding layer (230) and or (232) disposed in between the inner jacketing (225) and the outer jacketing (240").

The structural design of the cable (420) can be modified by incorporating a shielding layer (230) and or (232) disposed in between the wrapping layer (260) and the inner jacketing (225).

The structural design of the cable (420) can be modified by taking out the inner jacketing (225).

The structural design of the cable (420) can be modified by taking out the outer jacketing (240").

FIG. 11 shows the tenth exemplary cable (430) of the cable (500) or (400). The cable (430) has similar composition as the cable (410) and the cable (420), but in the absence of the reinforcement layer and the shielding layer respectively.

The structural design of the cable (430) can be modified by combining the inner jacketing (225) and the outer jacketing (240") to form a single insulating layer (225) or (240").

The structural design of the cable (430) can be modified by incorporating a shielding layer (230) and or (232) disposed in between the wrapping layer (260) and the inner jacketing (225).

The structural design of the cable (430) can be modified by replacing the inner jacketing (225) with a shielding layer (230) and or (232).

The structural design of the cable (430) can be modified by incorporating a reinforcement layer (250) disposed in between the wrapping layer (260) and the inner jacketing (225).

With continued reference to FIG. 9 to FIG. 11, an optional composition including a central strength member and cable filling compound can be considered for the multi-core cable (400). The optional composition disposes to fill the gaps in between the multiple numbers (n) of the insulated conductor core (305) to improve dimensional stability of the multiple numbers (n) of the insulated conductor core (305). The central strength member includes metal wire, thermoplastics and thermosetting rubber compound in a form of solid core. The cable filling compound includes thermoplastics, thermoplastic elastomers, thermosetting rubber and or filament yarns.

With continued reference to FIG. 2 to FIG. 11, the conductor core (210) of the cable (500) forms from at least partly from an electrically conducting material that includes carbon fibre or graphite fibre having filaments being arranged in a bundle extending side-by-side. Metal wire and or fibre optics can be incorporated as an additional composition of the conductor core for the transmission of power, data and signal. Copper and aluminum are typical metal wire conductor. The shielding layer (230), (232) and the reinforcement layer (250) are optional depending on the cable specification requirement. Certain cable specification may require cable design having at least one shielding layer. Certain cable specification may require cable design having at least one reinforcement layer. Certain cable specification may require cable design having a combination of shielding layer and reinforcement layer. A further optional protecting layer disposes around the outside of the outer insulating layers (240) and (240") including a yarn-braid with yarn filaments being derived from man-made fibres and glass fibre. Glass fibre is chosen for its incombustible property. Another optional protecting and shielding layer disposes around the outside of the outer insulating layer in a form of metal wire-braid. Steel wire-braid is chosen for its high tensile property. The cable (400) includes a single insulating layer of (225) or (240") disposed around the outside of the multiple numbers of the insulated conductor core when the wrapping layer (260), the shielding layer (230), (232) and the reinforcement layer (250) are absent. The single insulating layer being formed by single extrusion of polymeric material having a voltage breakdown (20° C.) of at least 18 KV/mm.

The cable (400) includes an outer jacketing (240") and an inner jacketing (225) disposed around the outside of the multiple numbers of the insulated conductor core when the wrapping layer (260), the shielding layer (230), (232) and the reinforcement layer (250) are absent.

The invention claimed is:

1. An electrical apparatus for conducting a current for matching a desired power output, the electrical apparatus comprising:
   a cable including at least one insulated conductor core, the insulated conductor core including:
      a conductor core including a conducting layer including carbon fiber or graphite fiber, and
      an insulating polymeric material disposed around an outside of the conductor core; and
   a transmission optimizer connected to the cable, the transmission optimizer being a transformer device that provides an adjustable voltage and current to the cable so that the cable provides the desired power output.

2. The electrical apparatus according to claim 1, wherein the cable has an electro-resistance per unit length of below 40 Ω/m.

3. The electrical apparatus according to claim 1, wherein the carbon fiber or graphite fiber have filaments arranged in a bundle, extending side-by-side.

4. The electrical apparatus according to claim 1, wherein the carbon fiber or graphite fiber has a specific gravity of 1.1 to 2.2 and a tensile strength of 690 MPa to 6.2 GPa, the carbon fiber or graphite fiber being derived from carbonization of man-made fiber, coal tar, and petroleum pitch.

5. The electrical apparatus according to claim 1, wherein the conductor core includes a combination of the carbon fibre or graphite fibre with metal wire, the metal wire having a specific gravity of 2.5 to 9 and a tensile strength of 89 MPa to 1.3 GPa.

6. The electrical apparatus according to claim 1, wherein the conductor core includes the carbon fibre or graphite fibre and fibre optics.

7. The electrical apparatus according to claim 1, wherein the conductor core includes the carbon fibre or graphite fibre, metal wire, and fibre optics.

8. The electrical apparatus according to claim 1, further comprising:
   a transmitter connected to a first end of the cable and configured to convert a coded electric or electronic pulse to an equivalent coded light pulse; and
   a conversion device connected to a second end of the cable and configured to convert the coded light pulse back to an equivalent coded electrical or electronic pulse, wherein
   the conductor core includes fibre optics for transmitting the coded light pulse.

9. The electrical apparatus according to claim 1, wherein the insulating polymeric material has a break down voltage of at least 18 KV/mm at 20° C.

10. The electrical apparatus according to claim 1, wherein the cable includes a shielding layer formed with metal tape or wire-braid disposed around an outside of the insulated conductor core.

11. The electrical apparatus according to claim 1, wherein the cable includes a shielding layer disposed around the outside of the conductor core, the shielding layer formed with a semi-conductive polymeric material having a resistivity in the range of 10 Ω·m to 100 MΩ·m at 15° C.

12. The electrical apparatus according to claim 1, wherein the cable includes a shielding layer disposed around an outside of the insulated conductor core and formed by yarn-braid or tape derived from carbon fibre or graphite fibre.

13. The electrical apparatus according to claim 1, wherein the cable includes an outer insulating layer disposed around an outside of the insulated conductor core, the outer insulating layer being a flame retardant polymeric material having a breakdown voltage of at least 18 KV/mm at 20° C. to protect the cable against damage from weathering and mechanical exposures.

14. The electrical apparatus according to claim 1, wherein the cable includes a reinforcement layer disposed around an outside of the insulated conductor core, the reinforcement layer being yarn-braid or tape derived from man-made fibers and glass fibre.

15. The electrical apparatus according to claim 1, wherein the cable includes an outermost layer that forms a protecting and shielding layer, the outermost layer being metal wire-braid.

16. The electrical apparatus according to claim 1, wherein the insulated conductor core does not include a reinforcement layer, a protecting layer, and a shielding layer.

17. The electrical apparatus according to claim 1, wherein the cable is a single-core cable that includes a single insulated conductor core.

18. The electrical apparatus according to claim 1, wherein the cable is a multi-core cable that includes a plurality of the insulated conductor core, the multi-core cable including from 2 to 100 of the insulated conductor cores.

19. The electrical apparatus according to claim 18, wherein the cable includes an insulating layer disposed around an outside of the plurality of the insulated conductor cores in a form of inner jacketing.

20. The electrical apparatus according to claim 18, wherein from two to eight of the plurality of the insulated conductor cores are loaded together with a wrapping layer to form a group, the wrapping layer including a screen material and a binder tape.

21. The electrical apparatus according to claim 1, wherein the cable includes a plurality of the insulated conductor core, the conductor cores of the plurality including the carbon fibre or graphite fibre and at least one of metal wire and fibre optics.

22. The electrical apparatus according to claim 1, wherein the carbon fibre is derived from the carbonization of the man-made fibers of cellulose, rayon, and homopolymer and copolymer of polyacrylonitrile.

23. The electrical apparatus according to claim 1, wherein the electrical apparatus is configured to conduct current ranging from 0.01 mA to 800 A at voltages ranging from 12V to 140 KV for matching the desired power output.

24. The electrical apparatus according to claim 1, wherein the desired power output includes transmissions of power, signal, and data.

25. A cable for conducting a current for matching a desired power output, the cable having a low electro-resistance of below 40 Ω/m, the cable comprising:
at least one insulated conductor core, and the insulated conductor core including:
a conductor core including an electrically conducting material that includes carbon fibre or graphite fibre,
an innermost insulating layer disposed around an outside of the conductor core, the innermost insulating layer including an insulating polymeric material having a breakdown voltage of at least 18 KV/mm at 20° C.;
an inner insulating layer that forms an inner jacketing by including a polymeric material having a breakdown voltage of at least 18 KV/mm at (20° C.) and disposed around the outside of the insulated conductor core; and
an outer insulating layer that forms an outer jacketing by being a flame retardant insulating polymeric material to protect the cable against damages from weathering and mechanical exposures, wherein
the cable is configured to conduct current ranging from 0.01 mA to 800 A at voltages ranging from 12V to 140 KV.

26. The cable according to claim 25, wherein the inner insulating layer and the outer insulating layer to form a single insulating layer by insulating polymeric material having a breakdown voltage of at least 18 KV/mm at 20° C.

27. The cable according to claim 25, wherein the desirable power output is achieved by connecting one end of the cable to a transmission optimizer.

28. The cable according to claim 25, further comprising:
a shielding layer disposed around the outside of the insulated conductor core, and the shielding layer is in a form of metal tape or metal wire-braid.

29. The cable according to claim 25, further comprising:
a protecting and shielding layer disposed around the outside of the outer insulating layer, the protecting and shielding layer being a metal wire-braid.

30. The cable according to claim 25, further comprising:
a protecting layer disposed around an outside of the outer insulating layer, the protecting layer being a yarn-braid derived from man-made fibers and glass fibre.

31. The cable according to claim 25, further comprising:
a plurality of the insulated conductor core, an outside of the plurality of the insulated conductor cores being surrounded by the inner insulating layer.

32. The cable according to claim 31, further comprising:
a central strength member in a form of a solid core; and
a cable filling compound including polymeric material and filament yarns, the cable filling compound being disposed inside the inner insulating layer to fill gaps in between the plurality of the insulated conductor core to improve the dimension stability of the plurality of the insulated conductor core.

33. The electrical apparatus according to claim 25, wherein the desired power output includes transmissions of power, signal, and data.

* * * * *